United States Patent [19]
Yung

[11] Patent Number: 5,392,414
[45] Date of Patent: Feb. 21, 1995

[54] RAPID DATA RETRIEVAL FROM DATA STORAGE STRUCTURES USING PRIOR ACCESS PREDICTIVE ANNOTATIONS

[75] Inventor: Robert Yung, Fremont, Calif.

[73] Assignee: Sun Microsystems, Inc., Mountain View, Calif.

[21] Appl. No.: 906,699

[22] Filed: Jun. 30, 1992

[51] Int. Cl.6 .................. G06F 12/12; G06F 12/10
[52] U.S. Cl. .................. 395/425; 395/400; 364/243.41; 364/243.43; 364/DIG. 1
[58] Field of Search .................. 395/600, 425, 400

[56] References Cited

U.S. PATENT DOCUMENTS

| | | | |
|---|---|---|---|
| 4,912,626 | 3/1990 | Fiacconi | 395/425 |
| 5,060,188 | 10/1991 | Zulian et al. | 395/425 |
| 5,099,415 | 3/1992 | Osler et al. | 395/400 |
| 5,148,538 | 9/1992 | Celtruda | 395/425 |
| 5,235,697 | 8/1993 | Steely, Jr. et al. | 395/425 |
| 5,287,487 | 2/1994 | Priem et al. | 395/425 |

*Primary Examiner*—Thomas G. Black
*Assistant Examiner*—Larry J. Elcessor
*Attorney, Agent, or Firm*—Blakely Sokoloff Taylor & Zafman

[57] ABSTRACT

A data storage structure and its complementary selection data storage structure is provided with a complementary predictive annotation storage structure comprising a number of corresponding predictive annotation vectors, each having a number of predictive annotation tuples. To retrieve data from a data block tuple of a data vector, a data vector and its corresponding data selection and predictive annotation vectors are read out concurrently. Determination is made as to whether there is a selection hit and a prediction hit. Concurrently, one of the predictive annotation tuples is selected and recorded for the next access based on the predictive annotation selected and recorded in the previous access. Also concurrently, a data block tuple is selected based on the predictive annotation selected and recorded in the previous access, and a data element is selected from the selected data block tuple based on the access key, without waiting for the determination results. Remedial actions are subsequently taken if it is determined that either there is no selection hit or no prediction hit. Additionally, the data vector, selection vector, the predictive annotation vector and the previously recorded predictive annotations are conditionally updated depending on the selection and prediction hit determinations.

18 Claims, 3 Drawing Sheets

RAPID DATA RETRIEVAL FROM DATA STORAGE STRUCTURES USING PRIOR ACCESS PREDICTIVE ANNOTATIONS

BACKGROUND OF THE INVENTION

1. Field of the Invention

The present invention relates to the field of computer systems, in particular, data retrieval techniques in computer systems. More specifically, the present invention relates to data retrieval from a data storage structure, e.g. a set associative cache.

2. Background

In order to expedite the availability of data and improve the overall system performance, there are many situations where a plurality of data vectors and their corresponding selection vectors are stored in an organized manner in complementary storage structures. Each data vector comprises a plurality of data block tuples, each data block tuple comprising a plurality of data elements. Each selection vector comprises a plurality of corresponding selection tuples. Such storage structures may be found in many general as well as special purpose computers regardless of their architectures. Perhaps the most well known example of such storage structures is a set associative cache. Another example is a multi-bank memory system. A not as well known example is a branch prediction table.

Data is retrieved by accessing a data vector and its corresponding selection vector concurrently from the complementary storage structures based on an access key. A data element is selected from a data block tuple using the access key if the corresponding selection tuple satisfies certain predetermined relationship to the access key. Traditionally, the data block tuple, and therefore the data element, are selected after determining which corresponding selection tuple satisfies the predetermined relationship (i.e. a hit).

Figure 1:
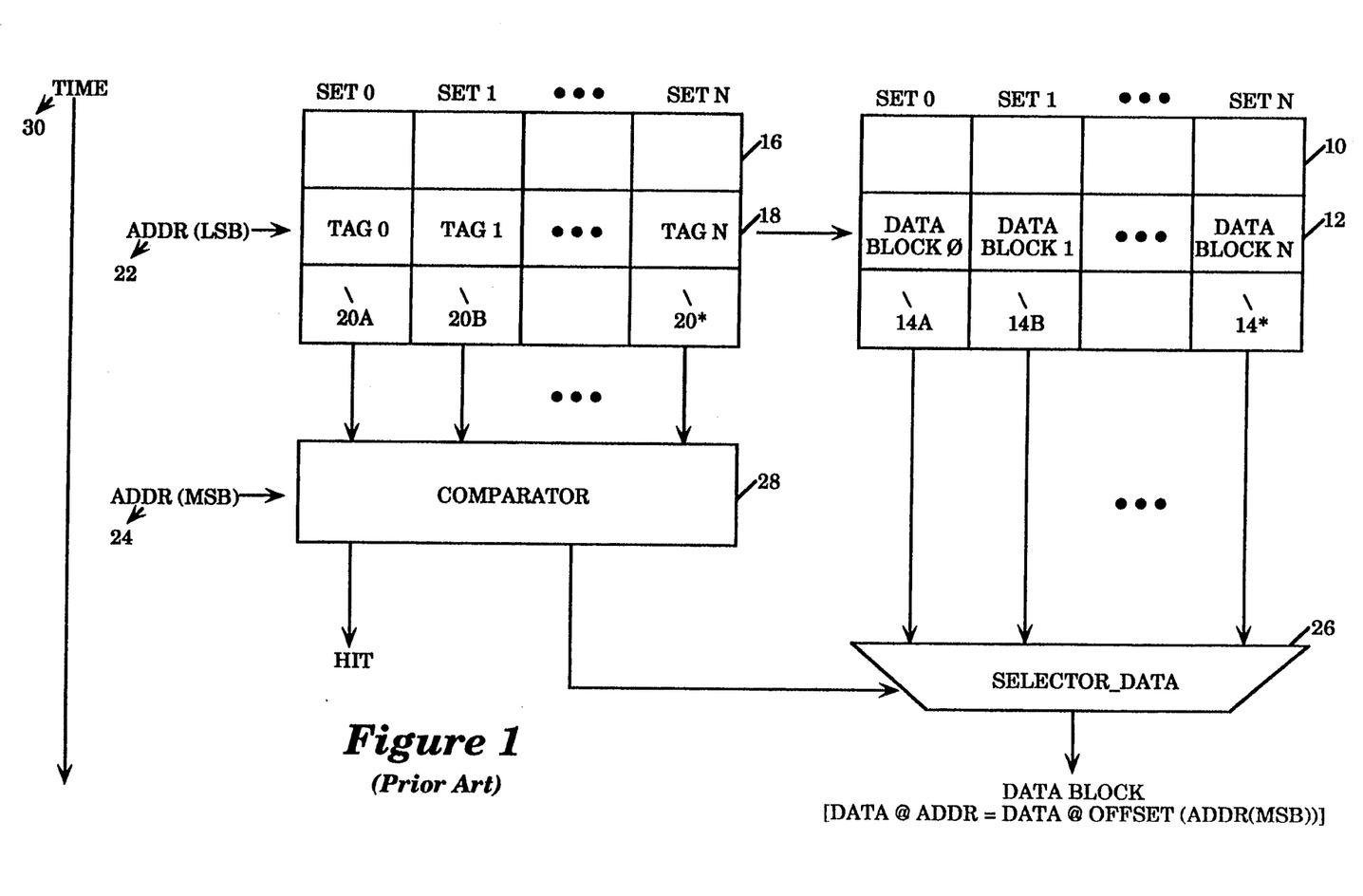
FIG. 1 shows an exemplary prior art set associative cache illustrating the prior art method for accessing data stored in a data storage structure.

FIG. 1 illustrates this traditional method of organizing and accessing data, and its disadvantage, with an exemplary n-ways set associative cache. Shown is a cache array 10 comprising a number of cache lines, e.g. 12, each cache line having n tuples of data block, e.g. 14a–14*. Each data block comprises a number of data elements. Also shown is a complementary cache tag array 16 comprising a number of corresponding tag entries, e.g. 18, each tag entry having n tuples of address tag, e.g. 20a–20*, and associated control information (not shown).

The data blocks stored in a cache line, e.g. 12, and their address tags stored in the corresponding tag entry, e.g. 18, are mad concurrently based on the lower order bits of an accessing address 22 and provided to a selector 26 and a comparator 28 respectively. The address tags, e.g. 20a–20*, are compared by the comparator 28 against the translated or untranslated higher order bits of the accessing address 24 to determine if there is a cache hit. An example of translation is virtual to physical translation. If there is a cache hit, the data block tuple corresponding to the address tag providing the cache hit is selected by the selector 26 based on input provided to the selector 26 by the comparator 28. A data element is then selected from the selected data block tuple based on the translated or untranslated higher order bits of the accessing address 24.

The reading out of the data blocks and address tags from the data and tag arrays, 10 and 16, the comparison performed by the comparator 28 and the selection made by the selector 26, are illustrated in FIG. 1 with reference to the timeline 30. As obvious from the illustration and the above description, the data block and data element selections are made after the address tag comparisons are completed. The desired data block and its data elements, even if they are stored in the cache line, are not used immediately after they have been read out of the cache array.

Thus, the traditional approach has at least one disadvantage in that wait time are incurred even for available desired data. The cumulative wait time is particularly costly if the data storage structure is accessed frequently and provides a high hit rate, for example, a large instruction cache. Therefore, it is desirable if available desired data are used as soon as they are read out of the storing structure or shortly thereafter.

As will be disclosed, the present invention provides a method and apparatus for rapidly retrieving data from data storage structures using prior access predictive annotations, also known as dynamic set prediction, which achieves the objects and desired results described earlier.

SUMMARY OF THE INVENTION

A method and apparatus for rapidly retrieving data from a data storage structure, also known as dynamic set prediction, is disclosed. The present invention has particular application for retrieving data from set associative caches, multi-bank memory systems, branch tables and like structures. A data storage structure and its complementary selection data storage structure is provided with a complementary predictive annotation storage structure comprising a number of predictive annotation vectors, each having a number of predictive annotation tuples. The predictive annotation vectors correspond to the data vectors and the selection data vectors in the same manner as the data vectors and the selection data vectors correspond to each other.

Additionally, a predictive annotation selector is provided to select a predictive annotation from a predictive annotation vector read out of the predictive annotation storage structure during an access. The selection is based on a previously recorded predictive annotation made during a prior access. The selected predictive annotation is itself recorded replacing the previously recorded predictive annotation. A latch is provided for successively recording these selected predictive annotations, one at a time.

A modified comparator is provided for performing selection hit determination based on an access key and a selection data vector concurrently read out of the selection data storage structure during the access. In addition, the modified comparator also determines whether the access results in a prediction hit based on the selection hit determination and the previously recorded predictive annotation in the latch.

A modified data selector is provided for selecting a data block from a data vector concurrently read out of the data storage structure during the access. The modified data selector makes the selection based on the previously recorded predictive annotation in the latch, A data element is then selected from the selected data block and speculatively used without waiting for the result of the selection hit determination.

Furthermore, if the modified comparator subsequently determines that the access does not result in a selection and a prediction hit, remedial actions are taken to cancel the usage result and obtain the correct data. A corrective policy is also provided to correct the recorded predictive annotation in the latch, the selected predictive annotation of the predictive annotation entry of the previous access in the predictive annotation storage structure, and a chosen predictive annotation of the predictive annotation entry of the current access in the predictive annotation storage structure, based on the results of the selection hit and prediction hit determinations.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for rapidly retrieving data from a data storage structure, also known as dynamic set prediction, is disclosed. The present invention has particular application for retrieving data from set associative caches, multi-bank memory systems, branch tables and like structures. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 2:
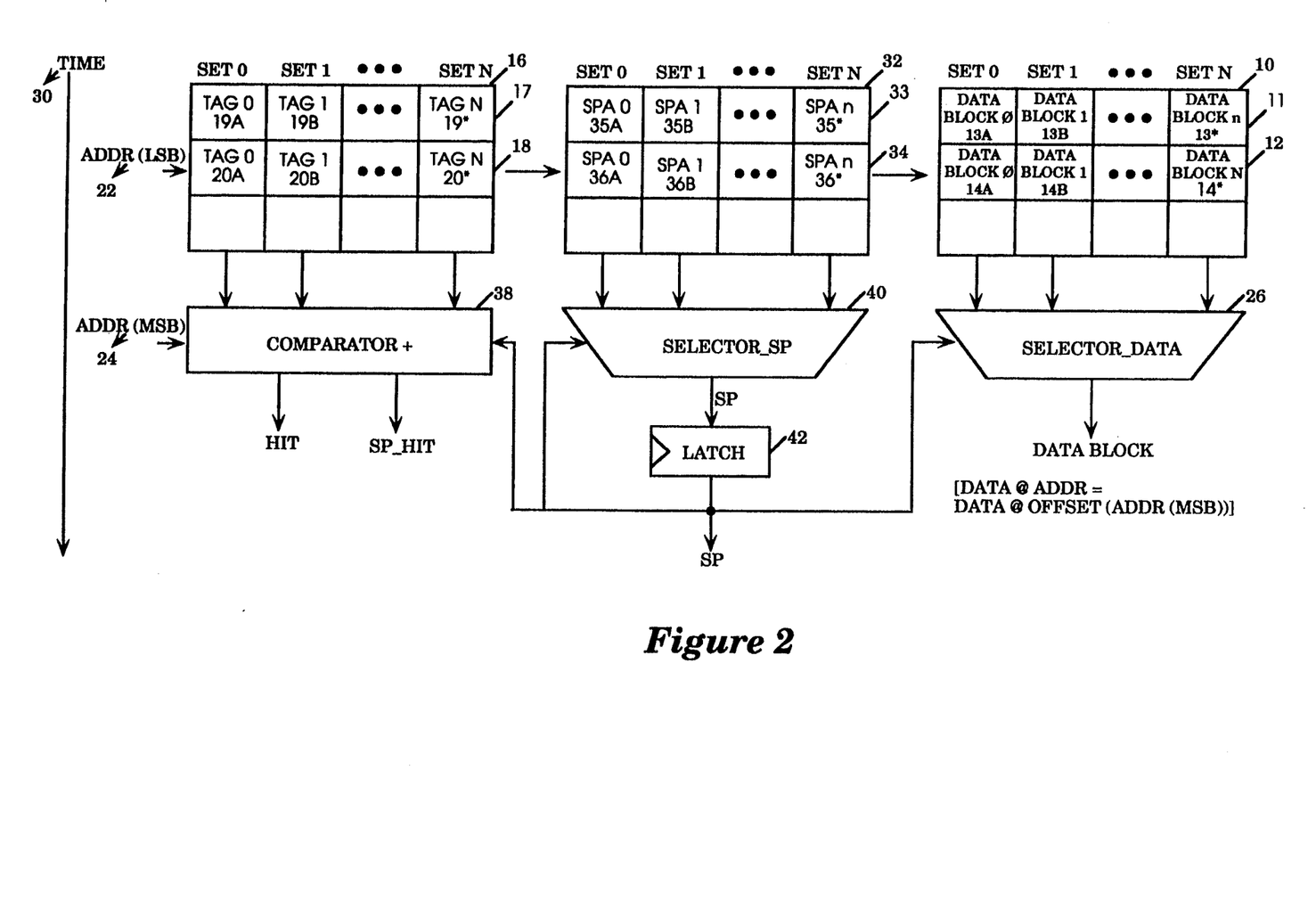
FIG. 2 shows an exemplary set associative cache incorporating the teachings of the present invention, illustrating the method and apparatus of the present invention for rapidly retrieving data stored in a data storage structure.

Referring now FIG. 2, a block diagram illustrating an exemplary n-ways set associative cache incorporating the teachings of the present invention is shown. While the present invention is being described and illustrated herein with an exemplary set associative cache, it will be appreciated that the present invention is not limited to set associative cache. The present invention may be practiced on any data storage structure including but not limited to set associative caches, multi-bank memory systems, and branch tables.

Shown is a cache array 10, its corresponding cache tag array 16, and a corresponding set predictive annotation array 32. A data block selector 26, a comparator 38, and a predictive annotation selector 40 is coupled to the cache array 10, the cache tag array 16 and the set predictive annotation array 32 respectively. Additionally, a latch 42 is coupled to the data block selector 26, the comparator 38, and the predictive annotation selector 40. Together, they cooperate to rapidly retrieve data stored in the cache array 10 under the control of a cache controller (not shown).

While the present invention is described herein with the exemplary set associative cache having separate cache tag array and set predictive annotation array, it will be appreciated that the present invention may be practiced with the two arrays combined. For example, the set predictive annotations may be added to the control information, such as replacement bits, valid bits, commonly found in cache tags.

The cache array comprises a number of cache lines, e.g. 11 and 12, each having n data blocks, 13a–13*, or 14a–14*. Each data block comprises a plurality of data elements. Correspondingly, the cache tag array comprises a number of cache tag entries, e.g. 17 and 18, each having n cache tags, 19a–19*, or 20a–20*, and the set predictive annotation array 32 comprises a number of set predictive annotation entries, e.g. 33 and 34, each having n set predictive annotations, 35a–35*, or 36a–36*. A cache line, e.g. 12, and its corresponding cache tag entry, e.g. 18, and set predictive annotation entry, e.g. 34, are accessed concurrently with an access address 22 during an access. More specifically, for this exemplary set associative cache, a cache line, e.g. 12, and its corresponding cache tag entry, e.g. 18, and set predictive annotation entry, e.g. 34, are indexed by the least significant bits of the access address 22.

The data block selector 26 is used to select a data block among the n data blocks, e.g. 14a–14*, of a data vector, e.g. 12, being read out of the cache array 10 during an access. The desired data is selected from the selected data block. The set predictive annotation selector 40 is used to select a set predictive annotation among the n corresponding set predictive annotations, e.g. 36a–36*, of a set predictive annotation vector, e.g. 34, being concurrently read out of the set predictive annotation array 32 during an access. The latch 42 is used to successively record the selected set predictive annotations from successive accesses, one at a time, with the currently recorded set predictive annotation superseding the previously recorded set predictive annotation. The comparator 38 is used to determine from a selection data vector, e.g. 18, being concurrently read out of the cache tag array 16 whether an access results in a cache hit, and additionally, whether an access results in a prediction hit.

The data block selector 26 makes the data block selection during an access speculatively, based on the recorded set predictive annotation in the latch 42 from a prior access, and without waiting for the result of the cache and prediction hit determination. The desired data is selected from the speculatively selected data block using either the translated or untranslated most significant bits of the access address 24. The speculatively selected desired data is advantageously used immediately. Similarly, the set predictive annotation selector 40 makes the set predictive annotation selection based on the recorded set predictive annotation in the latch 42 from a prior access. The comparator 38 makes the cache hit determination during an access based on either the translated or untranslated most significant bits of the access address 24. The comparator 38 makes the prediction hit determination during an access based on the result of the cache hit determination and the recorded set predictive annotation in the latch 42 from a prior access.

The cache controller controls the operations of these elements, including choosing which data block of the data vector of the current access get replaced by the data block comprising the desired data in the event of a cache miss, and canceling computations based on the speculatively selected desired data in the event of a cache miss or a prediction miss. The cache controller may choose a replacement data block in a variety of well known manners. For example, the cache controller may choose the data block to be replaced based on access history maintained in the corresponding cache tag entry, e.g. 18. The cache controller may update the access history in the cache tag corresponding to the selected data block during each access. The cache controller may also cancel the computations performed in a variety of well known manners. For example, the cache controller may cancel the computations performed by raising an execution exception.

Additionally, the cache controller implements a corrective policy correcting the recorded set predictive annotation in the latch 42, the selected set predictive annotation of the set predictive annotation entry of the prior access in the set predictive annotation storage structure 32, and a chosen set predictive annotation of the set predictive annotation entry of the current access in the set predictive annotation storage structure 32, based on the results of the cache and prediction hit determination. The chosen predictive annotation is the predictive annotation corresponding to the data block of the corresponding data vector chosen to be replaced with the data block comprising the desired data in the event of a cache miss.

Thus, if the set predictive annotations provide a high rate of prediction hits, only a small percentage of the computations has to be canceled, and only a small number of set predictive annotations have to be corrected. As a result, data are retrieved more rapidly from the data storage structure, resulting in improvement in system performance.

Figure 3:
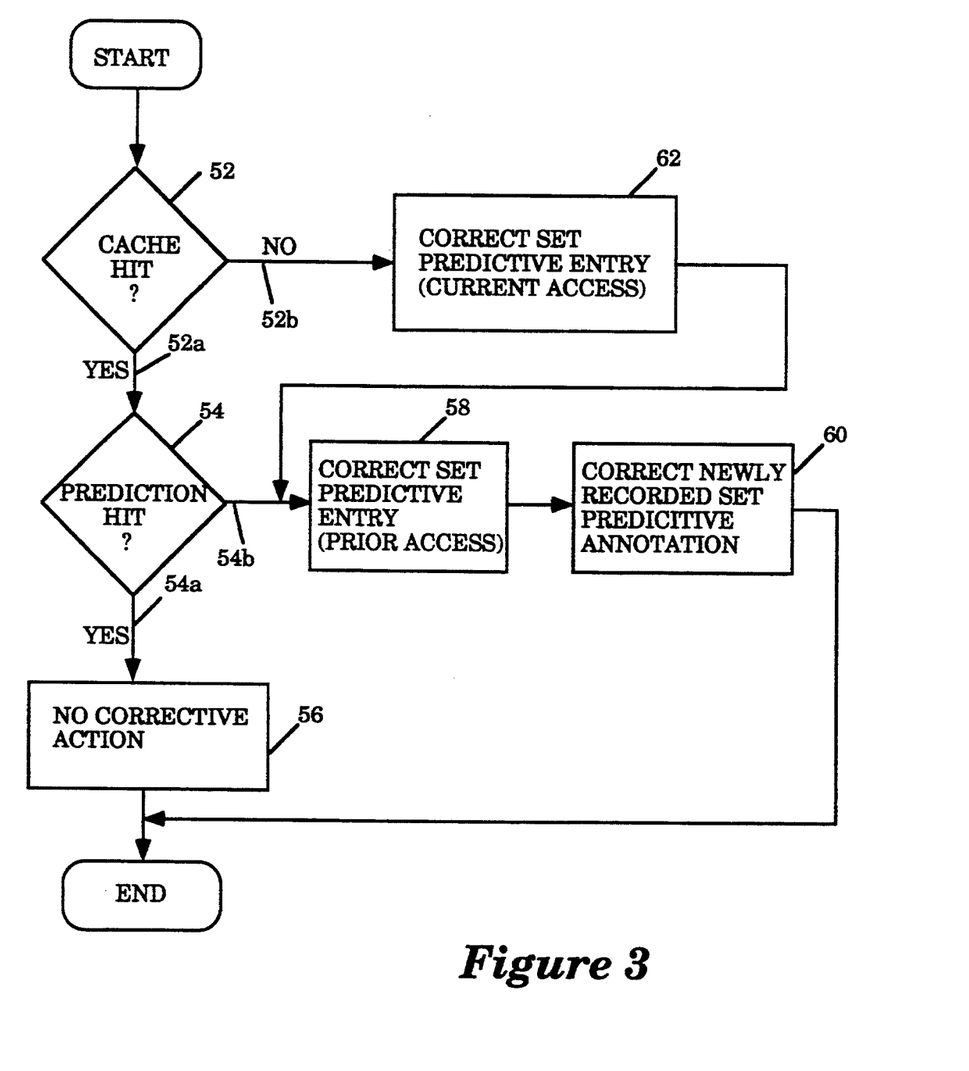
FIG. 3 illustrates the corrective policy of the exemplary set associative cache of FIG. 2, further illustrating the method of the present invention for rapidly retrieving data stored in a data storage structure.

Referring now to FIG. 3, a block diagram illustrating the corrective policy of the exemplary set associative cache of FIG. 2 is shown. If the comparator determines that an access results in a cache hit, branch 52a, and a prediction hit, branch 54a, no corrective action is taken. If the comparator determines that an access results in a cache hit, branch 52a, and a prediction miss, branch 54b, the selected set predictive annotation of the set predictive annotation entry of the prior access in the set predictive annotation array is corrected to predict the correct set position, block 58. The correct set position is the set position of the cache tag of the cache tag entry of the current access that provides the cache hit. The newly recorded set predictive annotation in the latch is corrected with the correct set predictive annotation, block 60. The correct set predictive annotation is the set predictive annotation of the set predictive annotation entry of the current access corresponding to the cache tag of the cache tag entry of the current access that provides the cache hit.

If the comparator determines that an access results in a cache miss, branch 52b, the chosen set predictive annotation of the set predictive annotation entry of the current access is corrected, block 62. The correction is application dependent. The selected set predictive annotation of the set predictive annotation entry of the prior access in the set predictive annotation array is also corrected to predict the correct set position, block 58. The correct set position is the set position of the data block of the data vector of the current access chosen to be replaced by the data block comprising the desired data. The newly recorded set predictive annotation in the latch is also corrected, block 60. The correction is also application dependent.

Typically, the corrections made to the chosen set predictive annotation of the set predictive annotation entry of the current access, and to the newly recorded set predictive annotation are coordinated. Experience have shown that correcting the chosen set predictive annotation of the set predictive annotation entry of the current access, and the newly recorded set predictive annotation, to predict the set position of the data block of the data vector of the current access chosen to be replaced by the data block comprising the desired data, produces a high rate of prediction hit.

Referring now back to FIG. 2, the corrective policy illustrated in FIG. 3 can be further illustrated with an exemplary access scenario using the two exemplary cache lines of data, 11 and 12, and their corresponding tag and set predictive annotation entries 17 and 33, and 18 and 34, respectively. Assume this exemplary access scenario comprises access m−1, m, and m+1. Assume further that the least significant bits of the accessing addresses of access m−1, m and m+1 index these accesses to a cache line other than the two exemplary cache lines 11 and 12, the exemplary cache line 11, and the exemplary cache line 12, respectively. Assume further that at the end of access m−1, a set predictive annotation predicting "set 0" is recorded in the latch 42 for access m. Accesses m and m+1 will proceed as follows.

While the set predictive annotation predicting "set 0" resulted from access m−1 is being recorded into the latch 42, the exemplary cache line 11 and its corresponding tag and set predictive entries, 17 and 33, are concurrently read out of the arrays respectively. The exemplary data blocks, 13a–13*, and the recorded set predictive annotation predicting "set 0" of access m−1 are provided to the data selector 26. Concurrently, either the translated or untranslated most significant bits of the accessing address of access m, the exemplary tags, 19a–19*, and the recorded set predictive annotation predicting "set 0" of access m−1 are provided to the comparator 38. Also concurrently, the exemplary set predictive annotations, 35a–35*, and the recorded set predictive annotation predicting "set 0" of access m−1 are provided to the set predictive annotation selector 40.

Since the recorded set predictive annotation of access m−1 predicts "set 0", the data selector 26 selects the exemplary data block 0 13a for computational use without waiting for the comparison results. Similarly, since the recorded set predictive annotation of access m−1 predicts "set 0", the set predictive annotation selector 40 selects the exemplary set predictive annotation 0 35a and stores it into the latch 42, replacing the previously recorded set predictive annotation of access m−1. Assuming further that the exemplary set predictive annotation 0 35a predicts "set 1", the recorded set predictive annotation in latch 42 now predicts "set 1" instead of "set 0". Assume further that the translated or untranslated most significant bits of the accessing address of access m matches with the exemplary tag 0 19a. Thus, the comparator 38 generates a cache hit as well as a prediction hit signal. Since the comparator 38 determines that access m results in a cache and prediction hit, as described earlier, no corrective action is taken by the cache controller.

While the set predictive annotation predicting "set 1" resulted from access m is being recorded into the latch 42, the exemplary cache line 12 and its corresponding tag and set predictive entries, 18 and 34, are concurrently read out of the arrays respectively. The exemplary data blocks, 14a–14*, and the recorded set predictive annotation predicting "set 1" of access m are provided to the data selector 26. Concurrently, the translated or untranslated most significant bits of the accessing address of access m+1, the exemplary tags, 20a–20*, and the recorded set predictive annotation predicting "set 1" of access m are provided to the comparator 38. Also concurrently, the exemplary set predictive annotations, 36a–36*, and the recorded set predictive annotation predicting "set 1" of access m are provided to the set predictive annotation selector 40.

Since the recorded set predictive annotation of access m predicts "set 1", the data selector 26 selects the exemplary data block 1 14b for computational use without waiting for the comparison results Similarly, since the recorded set predictive annotation of access m predicts "set 1", the set predictive annotation selector 40 selects the exemplary set predictive annotation 1 36b and stores it into the latch 42, replacing the previously recorded set predictive annotation of access m. Assuming further that the exemplary set predictive annotation 1 36b predicts "set 2", the recorded set predictive annotation in latch 42 now predicts "set 2" instead of "set 1". Assume further that the translated or untranslated most significant bits of the accessing address of access m+1 matches with the exemplary tag 3 20d. Thus, the comparator 38 generates a cache hit and a prediction miss signal.

Assume further that the exemplary set predictive annotation 3 36d predicts "set 4". Since the comparator 38 determines that access m+1 results in a cache hit and prediction miss, the exemplary set predictive annotation 0 35a of set predictive annotation entry 33 of the prior access m in the set predictive annotation array 32 is updated from predicting "set 1" to predicting "set 3". The newly recorded set predictive annotation in latch 42 is corrected from the recorded set predictive annotation predicting "set 2" to the correct set predictive annotation predicting "set 4".

However, if the translated or untranslated most significant bits of the accessing address of access m+1 does not match any of the exemplary tags, 20a–20*, the comparator 38 generates a cache miss signal. Assume further that set 4 of the exemplary cache line 12 is selected to store the data block comprising the desired data. The exemplary set predictive annotation 4 36e of the exemplary set predictive annotation entry 34 of the current access m+1 in the set predictive annotation army 32 is corrected. The exemplary set predictive annotation 0 35a of the exemplary set predictive annotation entry 33 of the prior access m in the set predictive annotation array 32 is corrected from predicting "set 1" to predicting "set 4". The newly recorded set prediction annotation in latch 42 is corrected.

Assume further that both exemplary set predictive annotation 4 36e of the exemplary set predictive annotation entry 34 of the current access m+1 in the set predictive annotation army 32, and the newly recorded set prediction annotation in latch 42, are to be corrected to the chosen set position. Then, both exemplary set predictive annotation 4 36e of the exemplary set predictive annotation entry 34 of the current access m+1 in the set predictive annotation array 32, and the newly recorded set prediction annotation in latch 42, are corrected to predict "set 4".

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a data storage structure, a method for rapidly retrieving data from said data storage structure and for predicting the locality of subsequent data access by recording previous predictive annotations and by determining prediction hits based on said previously recorded predictive annotations, said method comprising the steps of:

a) storing a plurality of data vectors in said data storage structure, each of said data vectors comprising a plurality of data blocks, and retrieving one of said data vectors based on an access key during a current access;

b) storing a plurality of predictive annotation vectors corresponding to said data vectors in a predictive annotation storage structure corresponding to said data storage structure, each of said predictive annotation vectors comprising a plurality of predictive annotations corresponding to said data blocks, and retrieving one of said predictive annotation vectors concurrently with said data vector being retrieved based on said access key during said current access;

c) selecting a data block from said currently retrieved data vector based on a predictive annotation previously recorded during a prior access;

d) selecting a predictive annotation from said currently retrieved predictive annotation vector concurrently with said data block selection based on said previously recorded predictive annotation; and    e) recording said currently selected predictive annotation to facilitate prediction hit determination during subsequent data access;

f) storing a plurality of selection data vectors corresponding to said data vectors in a selection data storage structure corresponding to said data storage structure, each of said selection data vectors comprising a plurality of selection data corresponding to said data blocks, and retrieving one of said selection data vectors concurrently with said data vector being retrieved based on said access key during said current access; and    g) determining whether said current access results in a selection hit and a prediction hit based on said access key, said currently retrieved selection data vector, and said previously recorded predictive annotation.

2. The method as set forth in claim 1, wherein, said method further comprises the step of:

h) correcting selected ones of said predictive annotations of said predictive annotation vectors contained in said predictive annotation storage structure, and said recorded predictive annotations, based on said prediction hit and selection hit determinations.

3. The method as set forth in claim 2, wherein, said predictive annotations correcting step comprises:

h.1) correcting said currently recorded predictive annotation if said current retrieval does not result in said selection hit and said prediction hit;

h.2) correcting a previously selected predictive annotation in a previously retrieved predictive annotation vector in said predictive annotation storage structure from which said previously recorded predictive annotation was made during said prior access if said current retrieval does not result in said selection hit and said prediction hit, and h.3) correcting a chosen predictive annotation in said currently retrieved predictive annotation vector in said predictive annotation storage structure if said current retrieval does not result in said selection hit, said chosen predictive annotation being a predictive annotation in said currently retrieved predictive annotation vector corresponding to a data block in said currently retrieved data vector chosen to be replaced by a replacement data block.

4. The method as set forth in claim 3, wherein,
if said current retrieval results in said selection hit but not in said prediction hit, a selection data in said currently retrieved selection data vector and said access key are determined in said step g) to satisfy a predetermined relationship; and
said currently recorded predictive annotation is replaced in said currently recorded predictive annotation correcting step with a predictive annotation occupying a vector position in said currently retrieved predictive annotation vector corresponding to said predetermined relationship that satisfies said selection data's vector position in said currently retrieved selection data vector.

5. The method as set forth in claim 3, wherein,
if said current retrieval does not result in said selection hit,
said previously selected predictive annotation in said previously retrieved predictive annotation vector in said predictive annotation storage structure is corrected in said previously recorded predictive annotation correcting step to predict a vector position corresponding to said chosen data block's vector position in said currently retrieved data vector.

6. The method as set forth in claim 5, wherein,
said currently recorded predictive annotation is corrected in said currently recorded predictive annotation correcting step to predict a vector position corresponding to said chosen data block's vector position in said currently retrieved data vector; and
said chosen predictive annotation in said chosen predictive annotation correcting step is also corrected to predict a vector position corresponding to said chosen data block's vector position in said currently retrieved data vector.

7. The method as set forth in claim 2, wherein,
said selection data storage and said predictive annotation structures are logical subsets of a merged selection data and predictive annotation storage structure;
each of said selection data vector and its corresponding predictive annotation vector are logical subsets of a merged selection data and predictive annotation vector; and
each of said selection data and its corresponding predictive annotation are logical subsets of a merged selection data and predictive annotation vector element.

8. The method as set forth in claim 2, wherein,
said data storage structure in said step a) is a cache array of a n-ways set associative cache, said data vectors being cache lines;
said predictive annotation storage structure in said step b) is a cache set predictive annotation array of said n-ways set associative cache, said predictive annotation vectors being set predictive annotation entries, said predictive annotations being set predictive annotations;
said selection storage structure in said step f) is a cache tag array of said n-ways set associative cache, said selection data vectors being cache tag entries, said selection data being address tags with associated control information;
said access key is an access address comprising a plurality of ordered address bits, said current retrieval in said steps a) b) and f) being made using a first subset of said plurality of ordered bits of said access address;
said selection hit determination in said step g) is a cache hit determination based on a second subset of said plurality of ordered bits of said access address; and
said prediction hit determination in said step g) is a set prediction hit determination based on said cache hit determination and said previously recorded set predictive annotation.

9. The method as set forth in claim 1, wherein,
said prior access is an immediately preceding access;
said subsequent access is an immediately succeeding access; and
said currently recorded predictive annotation supersedes said previously recorded predictive annotation.

10. In a computer system comprising a data storage structure, an apparatus for rapidly retrieving data from said data storage structure and for predicting data locality during subsequent data retrieval from said data storage structure by recording a previous predictive annotation, said apparatus comprising:

a) data storage means for storing a plurality of data vectors, each of said data vectors comprising a plurality of data blocks, one of said data vectors being retrieved based on an access key during a current access;

b) predictive annotation storage means corresponding to said data storage means for storing a plurality of predictive annotation vectors corresponding to said data vectors, each of said predictive annotation vectors comprising a plurality of predictive annotations corresponding to said data blocks, one of said predictive annotation vectors being concurrently retrieved with said data vector based on said access key during said current access;

c) data selector means coupled to said data storage means for selecting a data block from said currently retrieved data vector based on a predictive annotation previously recorded during a prior access, said data selector means being provided with said previously recorded predictive annotation;

d) predictive annotation selector means coupled to said predictive annotation storage means for selecting a predictive annotation from said currently retrieved predictive annotation vector concurrently with said data block section based on said previously recorded predictive annotation, said predictive annotation selector means being provided with said previously recorded predictive annotation; and e) recording means coupled to said predictive annotation selector means for recording said currently selected predictive annotation to facilitate prediction hit determination during a subsequent access.

f) selection data storage means corresponding to said data storage means for storing a plurality of selection data vectors corresponding to said data vectors, each of said selection data vectors comprising a plurality of selection data corresponding to said data blocks, one of said selection data vectors being concurrently retrieved with said data vector based on said access key during said current access; and g) determination means coupled to said selection data storage means for determining whether said current access results in a selection hit and a prediction hit based on said access key, said currently retrieved selection data vector, and said previously recorded predictive annotation, said determination means being provided with said previously recorded predictive annotation.

11. The apparatus as set forth in claim 10, wherein, said apparatus further comprises:

h) correction means coupled to said predictive annotation storage means and said recording means for correcting selected ones of said predictive annotations of said predictive annotation vectors contained in said predictive annotation storage structure, and said recorded predictive annotations, based on said prediction hit and selection hit determinations.

12. The apparatus as set forth in claim 11, wherein, said correction means corrects said currently recorded predictive annotation if said current retrieval does not result in said selection hit and said prediction hit;

said correction means further corrects a previously selected predictive annotation in a previously retrieved predictive annotation vector in said predictive annotation storage structure from which said previously recorded predictive annotation was made during said prior access if said current retrieval does not result in said selection hit and said prediction hit, and said correction means further corrects a chosen predictive annotation in said currently retrieved predictive annotation vector in said predictive annotation storage structure if said current retrieval does not result in said selection hit, said chosen predictive annotation being a predictive annotation in said currently retrieved predictive annotation vector corresponding to a data block in said currently retrieved data vector chosen to be replaced by a replacement data block.

13. The apparatus as set forth in claim 12, wherein, if said determination means determines said current retrieval results in said selection hit but not said prediction hit, said determination means determining that a selection data in said currently retrieved selection data vector and said access key satisfy a predetermined relationship; and said correction means replaces said currently recorded predictive annotation with a predictive annotation occupying a vector position in said currently retrieved predictive annotation vector corresponding to said predetermined relationship that satisfies said selection data's vector position in said currently retrieved selection data vector.

14. The apparatus as set forth in claim 12, wherein, if said determination means determines said current retrieval does not result in said selection hit, said correction means corrects said previously selected predictive annotation in said previously retrieved predictive annotation vector in said predictive annotation storage structure to predict a vector position equals to said chosen data block's vector position in said currently retrieved data vector.

15. The apparatus as set forth in claim 14, wherein, said correction means further corrects said currently recorded predictive annotation to predict a vector position corresponding to said chosen data block's vector position in said currently retrieved data vector; and said correction means further corrects said chosen predictive annotation to predict a vector position corresponding to said chosen data block's vector position in said currently retrieved data vector.

16. The apparatus as set forth in claim 11, wherein, said apparatus comprises a combined selection data and predictive annotation storage means comprising said selection data storage and said predictive annotation structures;

said merged selection data and predictive annotation storage means comprises a plurality of merged selection data and predictive annotation vectors, each of said merged selection data and predictive annotation vectors comprising one of said selection data vectors and its corresponding predictive annotation vector; and each of said merged selection data and predictive annotation vectors comprises a plurality of merged selection data and predictive annotation vector elements, each of said merged selection data and predictive annotation vector elements comprising one of said selection data and its corresponding predictive annotation.

17. The apparatus as set forth in claim 11, wherein, said data storage means is a cache array of a n-ways set associative cache, said data vectors being cache lines;

said predictive annotation storage means is a cache set predictive annotation array of said n-ways set associative cache, said predictive annotation vectors being set predictive annotation entries, said predictive annotations being set predictive annotations;

said selection storage means is a cache tag array of said n-ways set associative cache, said selection data vectors being cache tag entries, said selection data being address tags with associated control information;

said access key is an access address comprising a plurality of ordered address bits, said current retrieval being made using a first subset of said plurality of ordered bits of said access address;

said determination means comprises a comparator;

said selection hit determination is a cache hit determination based on a second subset of said plurality of ordered bits of said access address; and said prediction hit determination is a set prediction hit determination based on said cache hit determination and said previously recorded set predictive annotation.

18. The apparatus as set forth in claim 10, wherein, said prior access is an immediately preceding access;
said subsequent access is an immediately succeeding access;
said recording means comprises a latch coupled to said predictive annotation selector means for successively storing said previously recorded predictive annotation and said currently recorded predictive annotation, said currently recorded predictive annotation superseding said previously recorded predictive annotation; and
said latch provides said previously recorded predictive annotation to said data selector means, said predictive annotation selector means, and said determination means, said latch being also coupled to said data selector means and said determination means.

* * * * *